US006945560B2

(12) United States Patent
Strutz et al.

(10) Patent No.: US 6,945,560 B2
(45) Date of Patent: Sep. 20, 2005

(54) AIRBAG DEVICE FOR A VEHICLE

(75) Inventors: Torsten Strutz, Wolfsburg (DE); Axel Schoft, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 11 days.

(21) Appl. No.: 10/847,498

(22) Filed: May 17, 2004

(65) Prior Publication Data

US 2004/0212180 A1 Oct. 28, 2004

Related U.S. Application Data

(63) Continuation of application No. PCT/EP02/12312, filed on Nov. 5, 2002.

(30) Foreign Application Priority Data

Nov. 17, 2001 (DE) .......................................... 101 56 652
Jan. 24, 2002 (DE) .......................................... 102 02 551

(51) Int. Cl.$^7$ .......................... B60R 21/32; B60R 21/01
(52) U.S. Cl. ..................... 280/735; 701/45; 73/862.046
(58) Field of Search ........................... 280/735; 701/45; 338/99, 5, 208, 259; 73/862.041, 862.046, 862.045, 86.044

(56) References Cited

U.S. PATENT DOCUMENTS

| | | | | |
|---|---|---|---|---|
| 4,492,949 A | * | 1/1985 | Peterson et al. | ............ 338/114 |
| 4,795,998 A | | 1/1989 | Dunbar et al. | |
| 4,866,412 A | * | 9/1989 | Rzepczynski | ............... 338/114 |
| 6,216,546 B1 | | 4/2001 | Bahr | |
| 6,308,983 B1 | | 10/2001 | Sinnhuber | |
| 6,522,155 B2 | | 2/2003 | Pietsch et al. | |

FOREIGN PATENT DOCUMENTS

| | | |
|---|---|---|
| AU | 200040987 B2 | 9/2000 |
| DE | 196 25 730 A1 | 1/1998 |
| DE | 196 41 648 C1 | 1/1998 |
| DE | 198 26 484 A1 | 12/1999 |
| DE | 198 27 135 A1 | 12/1999 |
| DE | 198 28 162 A1 | 12/1999 |
| DE | 198 26 485 A1 | 1/2000 |
| DE | 199 10 194 C2 | 10/2000 |
| DE | 200 14 200 U1 | 1/2001 |
| EP | 0 812 741 A1 | 12/1997 |
| EP | 0 964 234 B1 | 12/1999 |

OTHER PUBLICATIONS

K. Billen et al: "Occupant Classification System for Smart Restraint Systems", *SAE Paper 1999–01–0761, pp. 33–38, XP–002184965.*

* cited by examiner

*Primary Examiner*—Ruth Ilan
(74) *Attorney, Agent, or Firm*—Laurence A. Greenberg; Werner H. Stemer; Manfred Beck

(57) ABSTRACT

An airbag device for a vehicle includes an airbag and a sensor element located on the side of the airbag which moves towards the vehicle occupant. The sensor element is formed of sensor strips which transmit sensed pressure changes in the form of a sensor signal to a control device. The amount of gas supplied by a filling device can be controlled in response to the sensor signal. The sensor element has resistor elements forming a matrix-type grid of spaced apart contact regions of the resistor elements. An electric resistance in a contact region of two resistor elements is dependent on the force or pressure load of the contact region. A voltage can be applied to least one of the resistor elements at least in one of the contact regions via an electrically conductive element which is in electrical contact with a resistor element at the contact region.

37 Claims, 5 Drawing Sheets

AIRBAG DEVICE FOR A VEHICLE

CROSS-REFERENCE TO RELATED APPLICATION

This application is a continuation, under 35 U.S.C. § 120, of copending international application No. PCT/EP02/12312, filed Nov. 5, 2002, which designated the United States; this application also claims the priority, under 35 U.S.C. § 119, of German patent application No. 101 56 652.2, filed Nov. 17, 2001, and German patent application No. 102 02 551.7, filed Jan. 24, 2002; the prior applications are herewith incorporated by reference in their entirety.

BACKGROUND OF THE INVENTION

Field of the Invention

The invention relates to an airbag device for a vehicle, in particular for a motor vehicle.

The demands made of airbag devices in a vehicle are becoming ever greater. A simple inflation or deployment of the airbag is no longer sufficient. It is thus desirable, in particular in respect of "out-of-position" situations in which the vehicle occupant is outside his or her normal sitting position, for the particular airbag not to be inflated with full momentum, but rather with a reduced volume of gas.

For this purpose, it is already known to provide airbag devices with control devices with which a controlled inflation of the airbag can take place. One such airbag device is disclosed, for example, in European Patent Application No. EP 0 812 741 A1, in which a thread or strap which is fastened to the inside of that front part of the airbag which faces the vehicle occupant is provided. When the airbag is filled, the thread or the strap follows the advancing of the deploying airbag, with the result that the advancing movement of the airbag can be detected, e.g. via the extension length or the extension time. If the front part of the airbag encounters an obstacle, e.g. a vehicle occupant who is out-of-position, this can be detected by the simultaneous reduction in the advancing movement of the thread or of the strap, with the result that the control device can suppress the further filling of the airbag with gas. Although in principle this airbag device permits the advancing movement of the deploying airbag to be interrupted when the front part of the airbag encounters an obstacle, the envisaged detection of the advancing movement through the use of the thread or the strap is relatively complicated and functionally not very reliable, with, in addition, the complete shutting off of the supply path when the airbag front part strikes against an obstacle also being undesirable for many accident situations. With a construction of this type which is not very practical, it is therefore not reliably possible to adequately protect the vehicle occupant during an accident and to rule out an aggressive inflation of the airbag, in particular in out-of-position situations.

In order to avoid these disadvantages, Published, Non-Prosecuted German Patent Application No. DE 198 27 135 A1 discloses an airbag device having an airbag which can be inflated with gas through the use of a filling device, can be advanced during the inflation into the passenger compartment of the motor vehicle and has at least one sensor element which is situated on that side of the airbag which moves toward the occupant. The sensor element responds to local pressure changes and passes on these sensed pressure changes as a sensor signal to a control device. The control device controls the filling device through the use of a control signal, such that it is possible for the quantity of gas supplied by the filling device to be controlled in response to a sensor signal which can be supplied by the sensor element which detects the advancing movement of the airbag.

Specifically, a sensor element which responds to a local pressure change and acts as scanning or sensing medium is arranged on that side of the airbag which moves toward the occupant. The scanning medium can be used to produce a sensor signal which characterizes the sensed pressure change. This sensor signal can be passed to the control device controlling the filling device. In one emodiment, a plurality of pressure-sensitive sensor elements is provided, the sensor elements being distributed over a defined region on that side of the airbag which moves toward the occupant. The disadvantage of this configuration is that each individual sensor element of the plurality of sensor elements has to be fastened separately to the airbag. In addition, a control line has to be guided from each individual sensor element to the control device in order to be able to pass on the detected sensor signals to the sensor elements. This is obviously complex.

Furthermore, a sensor for an airbag of an airbag device is also disclosed in Published, Non-Prosecuted German Patent Application No. DE 198 26 484 A1. The conventional sensor includes a matrix-like grid of conductive row fibers and column fibers which is embedded in a fabric, the row fibers and the column fibers being arranged in each case lying loosely above one another at contact points which are formed on the crossing regions of the row and column fibers. The row fibers and the column fibers are configured as elastic fibers formed of carbon fibers or a semiconductive polymer. The ends of the column and row fibers are connected to an electronic evaluation unit via electric connecting cables. The fibers are elastic and have a high flexural and bending flexibility in order to be able to be adapted to a deformation of the fabric. The material of the column and row fibers is selected in such a manner that a contact resistance between a column fiber and a row fiber is dependent on the pressure applied to the contact point. If pressure is applied to a contact point of this type, then the contact resistance between the relevant row fiber and column fiber is reduced. This change in resistance is detected by the connected electronic evaluation unit, as a result of which pressure changes at the contact points can be measured in a spatially resolved and/or temporally resolved manner.

In the case of the conventional sensor, the column and row fibers are contacted in each case at their ends by connecting cables via which the sensor is connected to the electronic evaluation unit. The elastic carbon fibers or polymer fibers used as column or row fibers at the same time form the electrical connection between the electric connecting cables and the contact point at which the change in resistance which is to be measured takes place. Elastic carbon fibers or polymer fibers have a higher specific resistance than metallic supply lines, as are used, when measuring resistance, as a rule as electrical connections between measuring instruments and the location at which the measurement is to take place. Although the measurement error caused as a result is low and the measuring accuracy is completely sufficient in most applications, it may be required to use the sensor for measurements in which, for example in conjunction with airbags, an increased measuring accuracy is required. This cannot be achieved when carbon or polymer fibers are used as the electrical connections between the connecting cables of the electronic evaluation unit and the contact points. The use of highly conductive metal fibers as column or row fibers is ruled out here since, when the sensor is deformed, as may occur, for example, when the sensor is used in an airbag for motor vehicles, the metal fibers may easily break or tear and are therefore susceptible to faults, and, moreover, easily oxidize, with oxidation at a contact point falsifying the measurement result.

German Utility Model No. DE 200 14 200 U1 furthermore discloses a sensor configuration for measuring the local distribution of a measurement variable that is configured as a sensor seat mat for recognizing occupation of a seat in a motor vehicle. This sensor configuration includes a plurality of distributed sensor elements which are connected together in the form of a matrix and the electrical behavior of which depends in each case on the local value of the measurement variable. Furthermore, a plurality of electrical connections connected to the sensor elements are provided in order to detect the electrical behavior of the individual sensor elements through the use of a measuring instrument, part of the sensor element including in each case a series circuit composed of a series element independent of the value of the measurable variable, and a measuring element dependent on the value of the measurable variable. A circuit configuration for measuring resistances, which are arranged in a matrix-like manner, of a pressure-sensitive resistance mat arranged in a vehicle seat for the purpose of recognizing occupation of the seat is also disclosed in German Patent No. DE 199 10 194 C2.

Similar structures are also disclosed in U.S. Pat. No. 4,795,998 and in the paper "Occupant Classification System for Smart Restraint Systems", by Karl Billen et al., SAE Paper No. 1999-01-0761, XP 002184965, in particular pages 33–38.

Furthermore, German Patent No. DE 196 41 648 C1 discloses a resistance measuring circuit which can be used for measuring a resistance of a resistive sensor resistor element and provides the measurement results in digital form. For this purpose, a series circuit is connected to a DC voltage of a DC voltage source, the series circuit including reference resistor units, each reference resistor and the measuring resistor being connected via a respective pair of conductors branching off from the series circuit to an analog multiplexer circuit which connects each of the pairs of conductors alternately to a capacitor, in order to charge the capacitor in each case to a charging voltage representing the voltage drop across the respectively connected resistor, and which, after the respective charging of the capacitor, separates the capacitor from the relevant pair of conductors and connects it to a discharging circuit containing a discharging resistor in order to discharge the capacitor. A time-measuring circuit measures the discharging time until the capacitor voltage drops to a predetermined value, and a control and evaluation circuit calculates the resistance of the measuring resistor on the basis of the measured values relating to the discharging time. The measuring resistor is a PT 100 platinum resistance temperature sensor.

SUMMARY OF THE INVENTION

It is accordingly an object of the invention to provide an airbag device which overcomes the above-mentioned disadvantages of the heretofore-known airbag devices of this general type and which has a sensor element which is disposed on an airbag and has a high measuring accuracy.

With the foregoing and other objects in view there is provided, in accordance with the invention, an airbag device for a vehicle, including:

an airbag configured to advance into a passenger compartment when being inflated, the airbag having a side moving toward an occupant when being inflated;

a filling device configured to inflate the airbag with gas;

a control device operatively connected to the filling device, the control device controlling the filling device via a control signal;

at least one sensor element disposed on the side of the airbag moving toward the occupant when being inflated, the at least one sensor element being responsive to local pressure changes, the at least one sensor element passing sensed pressure changes as a sensor signal to the control device;

the at least one sensor element being formed of sensor strips crossing over one another, the sensor strips being resistor elements and being configured to detect pressure changes;

the resistor elements forming a matrix grid with rows and columns of spaced apart contact regions of the resistor elements;

a respective one of the contact regions of corresponding two of the resistor elements having a respective electrical resistance dependent on one of a force loading and a pressure loading of the respective one of the contact regions;

an electrically conductive element in electrical contact with one of the resistor elements at one of the contact regions, the electrically conductive element applying a voltage to the one of the resistor elements at the one of the contact regions, the electrically conductive element having a lower resistance than the one of the resistor elements; and the filling device being controlled such that a quantity of gas supplied by the filling device can be controlled in response to a sensor signal supplied by the resistor elements detecting an advancing movement of the airbag.

In other words, according to the invention, there is provided, an airbag device for a vehicle, in particular for a motor vehicle, having an airbag which can be inflated with gas by a filling device, can be advanced during the inflation into the passenger compartment of the motor vehicle and has at least one sensor element which is situated on that side of the airbag which moves toward the occupant, and which responds to local pressure changes and passes on these sensed pressure changes as a sensor signal to a control device which controls the filling device by a control signal, the at least one sensor element being formed as resistor elements by using sensor strips which cross over one another and detect pressure changes and form a matrix-like grid having rows and columns of spaced apart contact regions of the resistor elements, an electrical resistance on a contact region of two resistor elements being dependent on the force or pressure loading of the contact region, wherein at least one of the resistor elements has a voltage applied to it at least on one of the contact regions through the use of an electrically conductive, low-resistance element which is in electrical contact with the resistor element on this contact region, and wherein the quantity of gas supplied by the filling device can be controlled in response to a sensor signal which can be supplied by the resistor element detecting the advancing movement of the airbag.

The effect advantageously achieved by these measures is that the transmission or branching-off of the signal indicating a change in the resistance from the crossing region of two resistor elements to an electric connecting line does not take place via the resistor elements themselves, but rather via the low-resistance or low-impedance, electrically conductive element. This results in increased measuring accuracy, even if the resistor elements are manufactured from a flexible and stretchable, elastic material which, although electrically conductive, has relatively high impedance.

An unambiguous determination of the position of the obstacle impacting on the airbag can advantageously be achieved by laying the sensor strips in a manner such that they cross over. In particular with a plurality of sensor strips laid next to one another and crossing one another and therefore with the formation of a "sensor matrix", this determination of the position is possible in a simple and precise manner, since, for example, certain position coordinates can be assigned to certain junction or crossing-over points in a manner similar to a system of coordinates. As a result, a particularly simple local assignment of current crash parameters in the vehicle interior, for example out-of-position situations, is possible.

The connecting of the individual sensor strips to cables can likewise be carried out readily, since only one connection is required for each sensor strip. As a result, a reaction, which can be carried out in a specific manner, of the filling device with respect to the airbag volume or the inflation behavior is possible via the control device. An optimum protection of the occupant, even in out-of-position positions, is optimally ensured herewith.

In a preferred embodiment, a first set of first sensor strips which run approximately parallel to one another and are spaced apart from one another and a second set of second sensor strips which run approximately parallel to one another and are spaced apart from one another are provided, the second sensor strips crossing over the first set of first sensor strips. This concerns a preferred matrix form, in which a large area of the sensor element is formed by the first set and the second set of sensor strips in a simple manner with optimum detection results.

In another preferred embodiment, the second set of second sensor strips crosses over the first set of first sensor strips in such a manner that gaps are formed in the regions adjacent to the individual crossing-over points. A possible mutual interlocking of the sensor strips with one another is ruled out by the spacing of the sensor strips, which lie parallel, and by the gaps following and resulting therefrom on the adjacent regions of the crossing-over points.

According to a further embodiment, the individual sensor strips of the individual sets are in each case at approximately the same distance from one another in order to form a regular pattern of gaps. This predetermines a regularity for fixing the sensor strips, e.g. by stitching, as a result of which the working step for fixing them is made easier.

In a particularly preferred embodiment, the first sensor strips are offset through 90° with respect to the second sensor strips in order to form approximately rectangular gaps. A regular fixing of the sensor strips from rectangular gap to rectangular gap is therefore possible. With the first and the second sensor strips arranged in this manner, an evaluation of the detection when a vehicle occupant makes contact with the airbag is possible in a simple manner, since the exact detection site can be assigned as in a system of coordinates.

According to a further embodiment, in each case at least one fabric layer forming the airbag outer skin and the airbag inner skin is provided on both sides of the sensor strips at least in the airbag impact region, the fabric layers covering the sensor strips and accommodating them between them. This firstly provides protection of the sensor strips during the production and during the intended use of the airbag and secondly forms a first fixing of the position of the sensor strips between the airbag outer skin and the airbag inner skin.

In a particularly preferred embodiment, the airbag is configured as a one-piece-woven airbag in such a manner that the sensor strips are woven into the airbag fabric. In this case, certain regions of the airbag in which the sensor strips are arranged can also in part be set up in two layers so as to form pockets or the like. Through the use of the sensor strips which are woven into the airbag fabric, an airbag is provided which, firstly, provides optimum functioning properties on account of the weaving technique and, secondly, delivers a functionally reliable detection of current crash parameters in the vehicle interior on account of the sensor strips.

According to another embodiment, the sensor strips are preferably woven between two layers of the airbag fabric of the one-piece-woven airbag. As a result, the sensor strips are, on the one hand, protected by the two layers of the airbag fabric during the production process and during the intended use of the airbag and, secondly, a manner of prefixing the sensor strips is provided.

In a further preferred embodiment, the two layers of the airbag fabric of the one-piece-woven airbag are woven together at least on one of the gaps which are adjacent to the crossing-over points of the first set of first sensor strips and of the second set of second sensor strips. With the use of the gaps which are adjacent to the crossing-over points of the sensor strips for weaving together the two layers of the airbag fabric, a secure final fixing of the sensor strips is ensured, and, with a regular pattern of gaps, the weaving process can be carried out in a simple manner.

In an alternative embodiment, the fabric layers situated on opposite sides of the sensor strips are stitched together. In this case, the gaps formed when the first and second sensor strips cross over one another form passage openings for the seams, preferably also for fixing the position of the sensor strips. A final fixing of the position of the sensor strips between the two fabric layers can therefore be produced in a simple manner. An additional fixing, e.g. by bonding, can therefore be omitted.

In another embodiment, the first and second sensor strips cross over one another in such a manner that a plurality of rows of gaps are formed, the rows running approximately parallel to one another and spaced apart from one another. The fabric layers can therefore be stitched along at least one part of the rows of gaps formed. This is an important aspect in respect of automating the stitching of the fabric layers.

In yet another embodiment, the seam, as seen in the stitching direction, crosses under a first part of first and/or second sensor strips and crosses over a second part of first and/or second sensor strips. That is to say, the seam, as seen from gap to gap, crosses over and under the sensor strips in alternating fashion. This ensures a secure fixing of the position of the sensor strips. In principle, the fixing of the position of the sensor strips of the first set and of the sensor strips crossing over them of the second set is possible with just one stitching direction.

In another embodiment, the seams run parallel to the first and/or second sensor strips in one stitching direction, and/or the seams are guided transversely over and under the crossing-over points of the first and second sensor strips. This prevents damage to the sensor strips during the stitching process. An unambiguous and precisely defined stitching distance is produced by the parallel alignment of the first and of the second sensor strips and by the regular spacing between these two sensor strips.

According to a preferred embodiment, a plurality of pressure-sensitive sensors is arranged in each case on the individual sensor strips. This makes it possible to detect a pressure change over the entire length of the individual sensor strip, and accordingly a sensor signal can be passed on to the control device.

According to a further embodiment, the sensor strips of the respective set of sensor strips preferably have approximately the same length and are connected in each case on the end side to a control line which is guided to the control device. As a result, a simple and clear cable connection can be produced in spite of the plurality of sensors which are arranged on the individual sensor strips.

According to a further embodiment, the filling device is configured as a conventional gas generator.

Provision is preferably made for the electrically conductive element to be strip-shaped and to be arranged along a row or column of the contact regions. As a result, a voltage is applied to each contact region of a row or column through the use of an electrically conductive element. It is no longer necessary for each contact region to be contacted individually by an electrically conductive element, which means that the outlay on manufacturing is reduced. The contact connection is achieved in a particularly simple manner if the strip-shaped, electrically conductive element is arranged along a strip-shaped resistor element in contact therewith. In this case, the relevant resistor element is contacted at least over part of its length, and therefore also each contact region situated in this part of the length of the resistor element is contacted, through the use of the electrically conductive element. This results in a further reduction in the outlay on manufacturing.

A further advantageous development of the invention makes provision for the electrically conductive element to be an electrically conductive fiber which is embedded in a resistor element. The effect achieved in a particularly reliable manner by the embedding in the resistor element is that the relevant resistor element is in electrical contact with the electrically conductive element, which is configured as a fiber, and the contact region or the contact regions of the resistor element can have voltage applied to it or them. In this case, it is particularly advantageous if the resistor elements are of strip-shaped configuration and the electrically conductive fiber extends over at least part of the length, preferably over the entire length, at least of one of the resistor elements. As a result, the entire part of the length of the resistor element and therefore all of the contact regions situated in this part of the length are contacted by the fiber and have voltage applied to them. It is furthermore advantageous if the electrically conductive fiber runs in a meandering manner in the resistor element. The effect advantageously achieved is that if the resistor element stretches, as may occur, for example, if an airbag is pressurized, only the meander of the fiber is extended without the latter being subjected to tensile forces and without being torn off.

Provision may be made for an element of a poorly conductive material to be arranged at least on one part of the contact regions between two resistor elements. This increases the electrical resistance between the two resistor elements on their contact region, with the result that an application of pressure to the contact region causes a greater absolute change in the resistance than if the resistor elements were directly in contact on this contact region. This results in increased measuring accuracy of the sensor. This increase in resistance is particularly effectively achieved if the element of poorly conductive material covers the entire area of the relevant contact region. This prevents the two resistor elements from being able to come into contact with each other on this contact region.

Provision may be made for the element or the elements of poorly conductive material to be of strip-shaped configuration and to be arranged along one or more strip-shaped resistor elements. As a result, a plurality of contact regions, preferably all contact regions, of the relevant resistor elements are provided through the use of an individual, continuous element of poorly conductive material, with the result that not every contact region has to be individually provided with an element of this type. This results in a reduction in the outlay on manufacturing.

Provision may be made for a layer to be arranged between the resistor elements which are arranged in rows and the resistor elements which are arranged in columns, the layers having insulating column and row regions and also poorly conductive regions which are delimited by these column and row regions and are arranged in the manner of a chessboard pattern, and which are arranged on the contact regions of the resistor elements between the latter. The effect advantageously achieved by this is that the use of an individual component, namely the layer having the poorly conductive elements, between the resistor elements means that an element of a poorly conductive material is arranged at a plurality of crossing regions, preferably at all of the crossing regions, these elements of a poorly conductive material being electrically insulated from one another. This results in a further reduction in the outlay on manufacturing.

One advantageous embodiment of the invention makes provision for the matrix-like grid to be arranged in a fabric, in particular an airbag fabric, and for electrodes which are arranged in rows and columns and which in turn make contact with the electrically conductive elements to be fastened to this fabric. The effect achieved by the integration in a fabric is that the sensor can easily be fitted at its site of use. In this case, provision is preferably made for the sensor to already be integrated in a component on which a pressurization is to be measured. The configuration of electrodes, which make contact with the electrically conductive elements, in the fabric has the effect that, should tears possibly occur in the electrically conductive elements, these tears are bridged by the electrodes, which means that an even more reliable application of voltage to the contact regions is achieved using the resistor elements.

Provision may be made for a plurality of resistor elements, preferably all of the resistor elements, which are arranged in columns and/or for a plurality of resistor elements, preferably all of the resistor elements, which are arranged in rows to be integrated in a sheet-like configuration and to be separated from one another by electrically insulating regions. This results in a simplification of the manufacturing process for the sensor according to the invention, since it is then no longer necessary for each resistor element to be fitted individually into the sensor, but rather a plurality of resistor elements, preferably all of the resistor elements, to be integrated in an individual component, and only this one component has to be fitted into the sensor during the manufacturing of the sensor.

According to another feature of the invention, a first set of the sensor strips are first sensor strips extending substantially parallel to one another and being spaced apart from one another; a second set of the sensor strips are second sensor strips extending substantially parallel to one another and being spaced apart from one another; and the second sensor strips cross over the first sensor strips.

According to yet another feature of the invention, the second sensor strips cross over the first sensor strips such that crossing-over points are defined and such that gaps are formed adjacent the crossing-over points.

According to a further feature of the invention, the first sensor strips are spaced apart from one another by a substantially same distance and the second sensor strips are spaced apart from one another by a substantially same distance such that the gaps form a regular pattern.

According to another feature of the invention, the first sensor strips are offset through 90° with respect to the second sensor strips such that the gaps are substantially rectangular gaps.

According to yet another feature of the invention, at least one fabric layer forms an airbag outer skin and at least a further fabric layer forms an airbag inner skin; and the airbag has an airbag impact region, the airbag outer skin and the airbag inner skin are provided at least in the airbag impact region on both sides of the sensor strips such that the airbag outer skin and the airbag inner skin cover the sensor strips in the airbag impact region and the sensor strips are accommodated between the airbag outer skin and the airbag inner skin.

According to a further feature of the invention, the airbag is a one-piece-woven airbag with an airbag fabric, and the sensor strips are woven into the airbag fabric.

According to yet a further feature of the invention, the sensor strips are woven between two layers of the airbag fabric of the one-piece-woven airbag.

According to another feature of the invention, the sensor strips are woven between two layers of the airbag fabric of the one-piece-woven airbag such that the two layers form pockets.

According to yet another feature of the invention, a first set of the sensor strips are first sensor strips extending substantially parallel to one another and being spaced apart from one another; a second set of the sensor strips are second sensor strips extending substantially parallel to one another and being spaced apart from one another; the second sensor strips cross over the first sensor strips; the second sensor strips cross over the first sensor strips such that crossing-over points are defined and such that gaps are formed adjacent the crossing-over points; and the two layers of the airbag fabric of the one-piece-woven airbag are woven together at least at one of the gaps adjacent to the crossing-over points.

According to a further feature of the invention, the second sensor strips cross over the first sensor strips such that crossing-over points are defined and such that gaps are formed adjacent the crossing-over points; and seams are provided such that the at least one fabric layer and the further fabric layer disposed on opposite sides of the sensor strips are stitched together and such that the gaps form passage openings for the seams.

According to another feature of the invention, the seams hold the sensor strips in a given position.

According to yet another feature of the invention, the first and second sensor strips cross over one another such that a plurality of rows of gaps is formed, the rows of gaps extend substantially parallel to one another and are spaced apart from one another; and the at least one fabric layer and the further fabric layer are stitched together along at least a part of the rows of gaps.

According to a further feature of the invention, the seams define a stitching direction, and the seams cross under a first part of the first and/or second sensor strips and cross over a second part of the first and/or second sensor strips as seen in the stitching direction.

According to another feature of the invention, the seams, as seen from one of the gaps to an adjacent one of the gaps, alternately cross over and under the first and/or second sensor strips.

According to a further feature of the invention, the seams run parallel to the first and/or second sensor strips.

According to another feature of the invention, the seams run transversely alternately over and under the crossing-over points where the first and second sensor strips cross one another.

According to yet another feature of the invention, a control line connects the first sensor strips to the control device.

According to a further feature of the invention, the first sensor strips are of substantially equal length and each of the first sensor strips has an end region connected to the control line.

According to another feature of the invention, a control line connects the second sensor strips to the control device.

According to yet another feature of the invention, the second sensor strips are of substantially equal length and each of the second sensor strips has an end region connected to the control line.

According to another feature of the invention, the electrically conductive element is a strip-shaped element disposed along one of the rows or columns of the contact regions of the resistor elements.

According to a further feature of the invention, the electrically conductive element is a strip-shaped element disposed along one of the resistor elements and is in contact with the one of the resistor elements.

According to yet a further feature of the invention, the electrically conductive element is an electrically conductive fiber embedded in one of the resistor elements.

According to another feature of the invention, the one of the resistor elements has a given length, and the electrically conductive fiber extends over at least part of the given length of the one of the resistor elements.

According to yet another feature of the invention, the electrically conductive fiber extends in a meander pattern in the one of the resistor elements.

According to another feature of the invention, an element formed of a poorly conductive material is disposed between two of the resistor elements at one of the contact regions of the resistor elements.

According to a further feature of the invention, the one of the contact regions has a given area, and the element formed of poorly conductive material entirely covers the given area of the one of the contact regions.

According to yet a further feature of the invention, elements formed of a poorly conductive strip-shaped material are disposed between respective two of the resistor elements at respective ones of the contact regions of the resistor elements and extend along respective ones of the resistor elements.

According to another feature of the invention, a layer is disposed between a first and a second group of the resistor elements, the first group of the resistor elements is disposed along the rows, the second group of the resistor elements being disposed along the columns; the layer has insulating column regions, insulating row regions, and poorly conductive elements delimited by the insulating column regions and by the insulating row regions such that the poorly conductive elements form a chessboard pattern; and the poorly conductive elements are disposed between the resistor elements at the contact regions of the resistor elements.

According to another feature of the invention, the matrix grid is disposed in a fabric; electrodes are fastened to the fabric; the electrodes are disposed in rows and columns and are in contact with the electrically conductive elements.

According to yet another feature of the invention, at least some and preferably all of the resistor elements disposed in the rows and the columns are integrated in a sheet configuration, the sheet configuration has insulating regions separating the at least some and preferably all of the resistor elements from one another.

Other features which are considered as characteristic for the invention are set forth in the appended claims.

Although the invention is illustrated and described herein as embodied in an airbag device for a vehicle, in particular for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
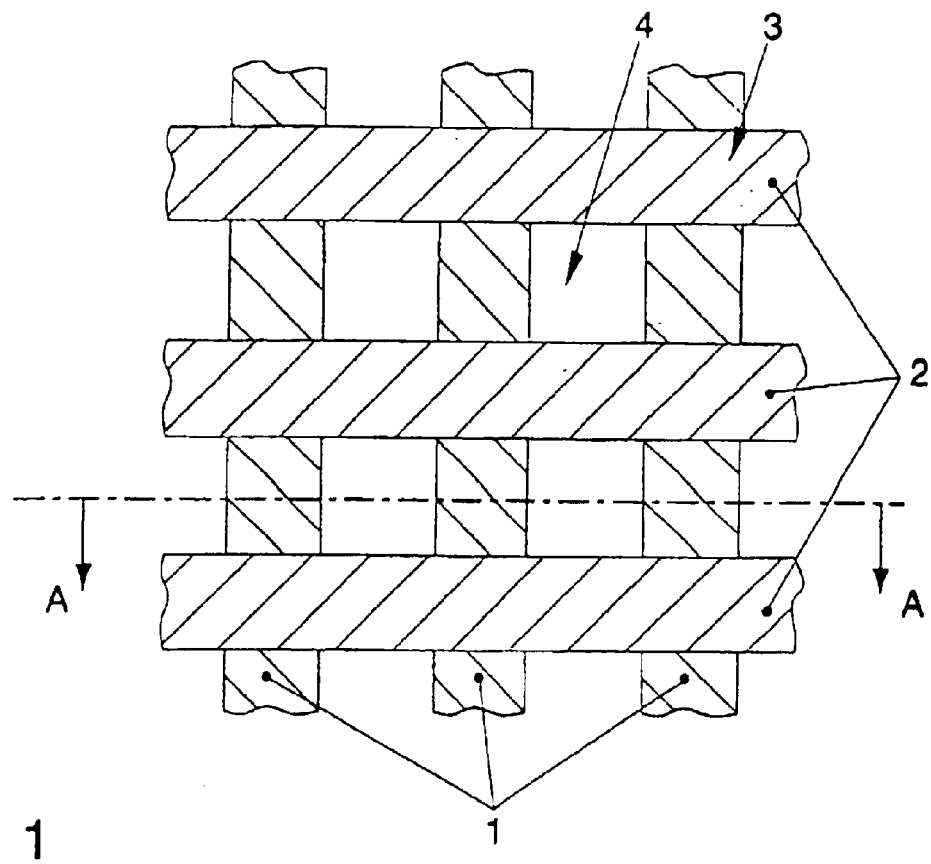
FIG. 1 is a diagrammatic plan view of sensor strips placed crosswise according to the invention.

Referring now to the figures of the drawings in detail and first, particularly, to FIG. 1 thereof, there is shown a plan view of sensor strips 1, 2 placed crosswise. In this case, a first set of first sensor strips 1 which run parallel to one another and are placed apart from one another and a second set of second sensor strips 2 which run parallel to one another and are placed apart from one another are laid crosswise. The two sets of sensor strips 1 and 2 are offset through 90°. Gaps 4 are formed on the regions adjacent to the individual crossing-over points 3 through the use of the spacing between the individual sensor strips 1 and 2, which run in parallel, of the two sets. As a result, rows of gaps which run parallel to one another and are spaced apart from one another are formed. A stitching for fixing the position of the sensor strips 1 and 2 has been left out in FIG. 1 for reasons of clarity, the gaps 4 forming passage openings for the stitching.

Figure 2:
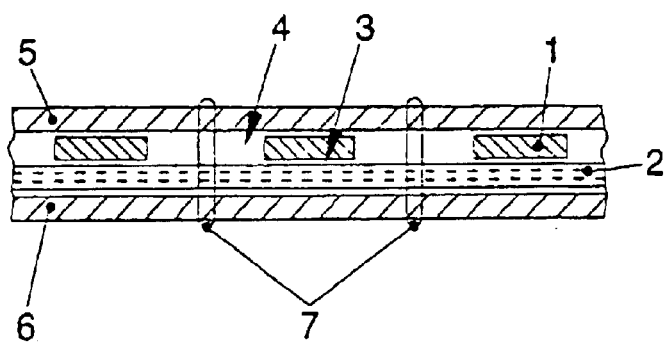
FIG. 2 is a partial diagrammatic sectional view of an airbag device according to the invention along section line A—A in FIG. 1.

FIG. 2 illustrates a schematic sectional view along the line A—A of FIG. 1. The sensor strips 1 and 2 which are laid crosswise are covered from the one side by an airbag outer skin 5 and from the other side by an airbag inner skin 6, with the result that the sensor strips are accommodated between the two airbag skins 5 and 6. The gaps 4 formed when the first and second sensor strips 1 and 2 cross over form passage openings for a seam 7. In this case, the fabric layers which are arranged on opposite sides of the sensor strips 1 and 2 and form the airbag outer skin 5 and the airbag inner skin 6 are stitched to each other.

In principle, the connection between the two fabric layers, the airbag outer skin 5 and the airbag inner skin 6, is also possible by alternative measures. Thus, for example, the production of the airbag by the one-piece-woven technique is possible. In this case, a seamless airbag woven in two layers is produced and the sensor strips are woven into it.

Figure 3:
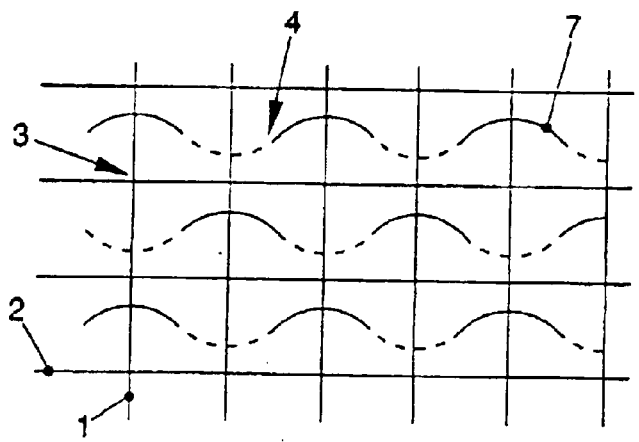
FIG. 3 is a schematic view of a stitching pattern of sensor strips according to the invention.
Figure 4:
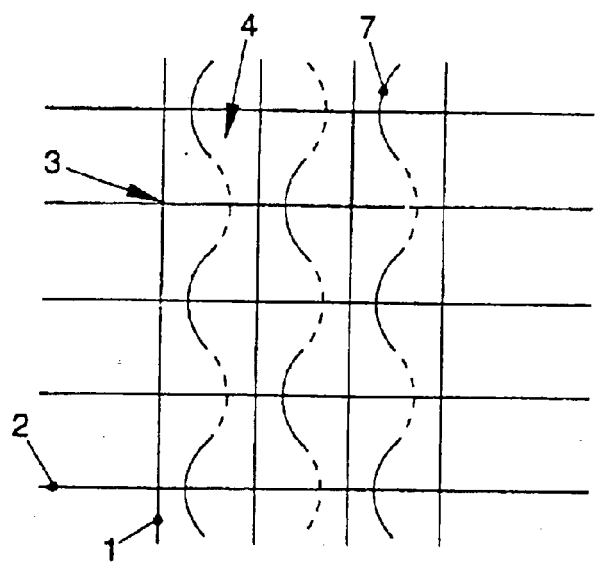
FIG. 4 is a schematic view of an alternative variant of a stitching pattern of sensor strips according to the invention.
Figure 5:
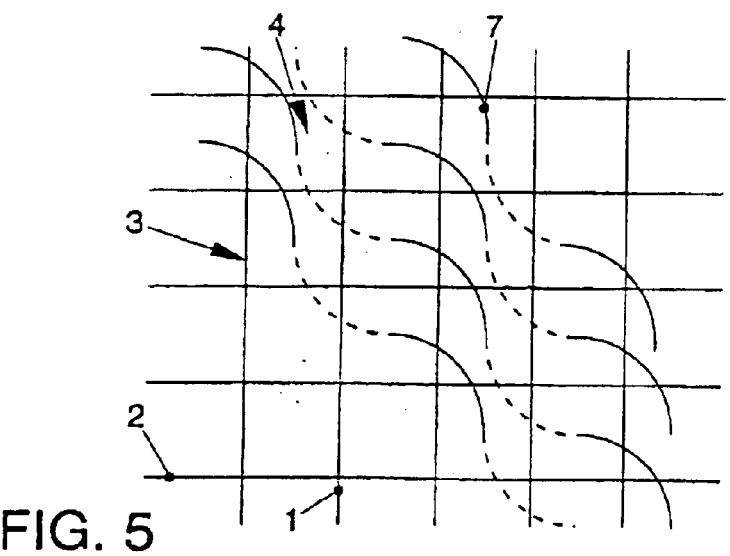
FIG. 5 is a schematic view of a further alternative variant of a stitching pattern of sensor strips according to the invention.

FIGS. 3 to 5 illustrate different variants in each case of the stitching of the sensor strips 1 and 2. In FIG. 3 the stitching direction of the seams 7 runs parallel to the second sensor strips 2, in FIG. 4 the stitching direction of the seams 7 runs parallel to the first sensor strips 1, and in FIG. 5 the stitching direction of the seams runs diagonally to the two sensor strips 1 and 2 which are situated crosswise. In each stitching variant, the sensor strips, as seen from gap to gap 4, are crossed over and under by the seam 7 in alternating fashion. For reasons of clarity, the airbag outer skin 5 or the airbag inner skin 6 is not illustrated in FIGS. 3 to 5. In principle, a combination of the three variants of stitching directions is also possible.

The laying of the first sensor strips 1 and of the second sensor strips 2 crossing over one another results in the formation of a sensor element with which pressure changes which are produced by the airbag striking against an object situated in its path are sensed and passed on to a control device. The manner in which the sensor strips are laid, namely next to one another and crossing over one another, results in the formation of a "sensor matrix" with which the determination of the position of the obstacle encountered is possible in a simple and precise manner. As a result, the quantity of gas supplied by a filling device can control the advancing movement of the airbag in reaction to the sensor signal. This increases the protection of the occupant especially in out-of-position positions.

Figure 7:
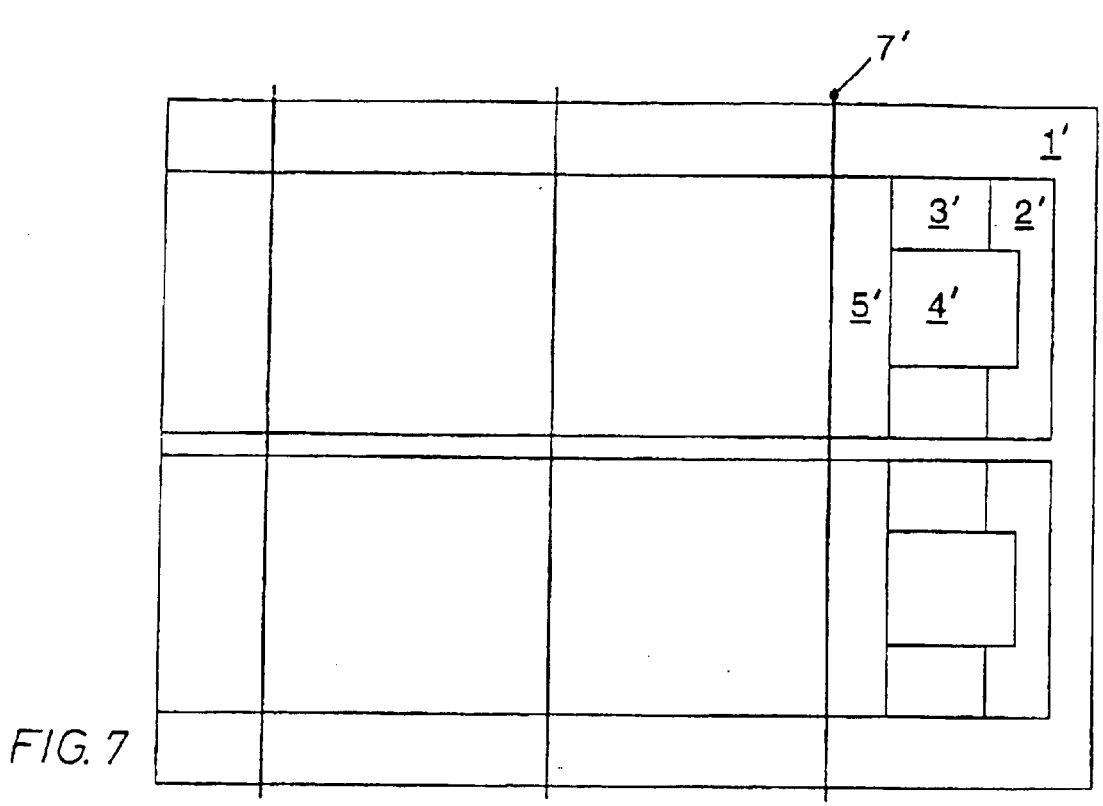
FIG. 7 is a diagrammatic plan view and partially sectional view of a first part of the sensor according to FIG. 6 as seen in the direction II.
Figure 6:
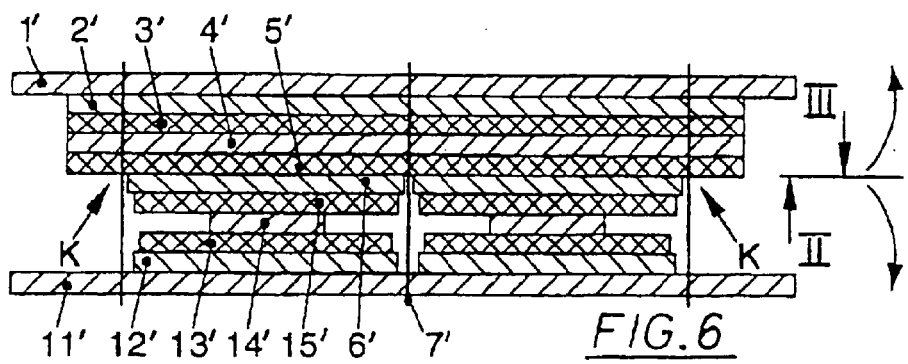
FIG. 6 is a greatly enlarged diagrammatic sectional view of a sensor according to the invention in accordance with a first exemplary embodiment.
Figure 8:
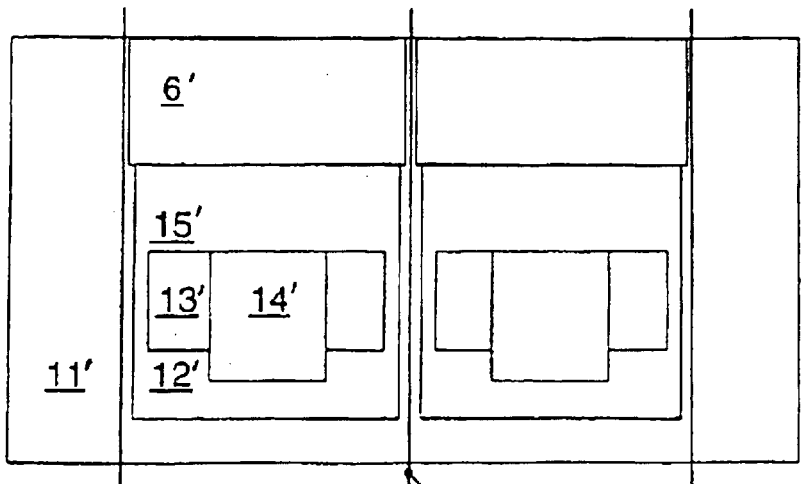
FIG. 8 is a diagrammatic plan view and partially sectional view of a second part of the sensor according to FIG. 6 as seen in the direction III.

FIGS. 6 to 8 show a first exemplary embodiment of a sensor according to the invention. The sensor has strip-shaped resistor elements 5' which are arranged in rows and strip-shaped resistor elements 15' which are arranged in columns and overlap one another in such a manner that they form a matrix-like grid of contact regions K. Arranged on the contact regions K, between the resistor elements 5' which are arranged in rows and the resistor elements 15' which are arranged in columns, is a respective element 6' of a poorly conductive material which covers the entire contact region K concerned. In the exemplary embodiment shown here, the elements 6' of poorly conductive material are likewise of strip-shaped configuration and run along the resistor elements 15', which are of strip-shaped configuration and are arranged in columns. Strip-shaped, electrically conductive elements 4', 14' of a readily conductive material, in the exemplary embodiment shown here of metal, are arranged longitudinally with respect to the resistor elements 5', 15' and in contact therewith, with the result that the resistor elements 5', 15' and therefore also the contact regions K on the resistor elements 5', 15' can have a voltage applied to them via these electrically conductive elements 4', 14'. The sensor shown here is integrated here by way of example in an airbag fabric which has outer layers 1', 11' to which the sensor is fastened through the use of bonding layers 2', 12'. The sensor furthermore has electrodes 3', 13' which are manufactured from metal and which run along the strip-shaped, electrically conductive elements 4', 14' and are in contact with them. The electrically conductive elements 4', 14', or alternatively the electrodes 3', 13', can be connected to an evaluation device via connecting lines. The fabric is held together by seams 7' which at the same time separate the columns which have the electrodes 13' arranged in columns, the electrically conductive elements 14' arranged in columns and the resistor elements 15' arranged in columns and the elements 6' of poorly conductive material from one another.

The measuring principle of the sensor, which corresponds essentially to the measuring principle of the sensor disclosed in Published, Non-Prosecuted German Patent Application No. DE 198 26 484 A1, is based on the fact that the resistor elements 5', 15' and the element 6' of poorly conductive material arranged between the latter are essentially only loosely in contact with one another in the contact regions K. When pressure or force is applied to the relevant contact region K, the resistor element 5' of the row, the element 6' and the resistor element 15' of the gap are compressed. This causes a decrease in the electrical resistance between the resistor element 5' of the row and the resistor element 15' of the column, on the contact region K thereof. A measurement of the resistance therefore allows the magnitude of the application of pressure or force to the contact region K to be determined. When the contact region K has voltage applied to it, the measuring signal of the measurement of the resistance is the current flowing through the contact region K from the resistor element 5' of the row to the resistor element 15' of the column.

In contrast with the sensor disclosed in Published, Non-Prosecuted German Patent Application No. DE 198 26 484 A1, the direct application of voltage to the contact regions K by the metal strips 4', 14' has the additional significant advantage that an electric measuring signal, in this case the current which characterizes the resistance and passes through the contact region K, does not have to be branched off via the relatively high-impedance resistor elements 5', 15' themselves, but rather via the low-resistance metal strips 4', 14' which are in contact with the contact region K. In interaction with the poorly conductive elements 6' which are situated between them, the resistor elements 5', 15' therefore only form on the contact regions K electrical resistances which can be changed by the application of force or pressure and are therefore suitable for characterizing an application of force or pressure to the contact regions K. The contact regions K can therefore be connected directly to the evaluation device via the metal strips 4', 14' and further connecting lines.

In this case, the metal strips 4', 14' are not fixed over the entire surface to the strip-shaped resistor elements 5', 15', but rather rest loosely on them or are only fixed to them in a pointwise manner in order to avoid damage to the metal strips 4', 14' if the resistor elements 5', 15' are stretched as a result of pressure being applied. In the event of damage nevertheless occurring to a metal strip 4', 14', for example due to tears, the electrodes 3',13' electrically bridge such damage. The electrodes 3', 13' therefore increase the reliability of the sensor, but are not absolutely necessary. In the exemplary embodiment shown here, the metal strips 4', 14' are in contact essentially over their entire length with the row or column conductor tracks 5', 15'. However, provision may also be made to configure and arrange the electrically conductive elements 4', 14' in such a manner that they merely make contact with selected contact regions K.

In the exemplary embodiment shown here, provision is made to separate the resistor elements 5', 15' on each contact region K through the use of a poorly conductive element 6'. However, it is also possible to provide elements 6' only on individual contact regions K or to omit them entirely. In this case, the measuring principle remains the same, but if there is direct contact between two resistor elements 5', 15', the electrical resistance in the contact region K is substantially smaller, with the result that if pressure is applied only an essentially smaller, absolute change in resistance can be measured. Furthermore, provision may be made, rather than configuring the elements 6' to be strip-shaped, merely to make them of such a size that they cover the particular contact region K.

The effect achieved by separating the columns 6', 12', 13', 14', 15' through the use of seams 7' is that adjacent columns do not slip, and that an electrical short circuit between adjacent columns, which could falsify the measurement result, does not come about. Provision may likewise be made for rows to be separated from one another through the use of seams.

In the exemplary embodiment illustrated here, the sensor has two rows and two columns. This illustration has been selected for the sake of clarity, a sensor according to the invention generally having more than two rows and more than two columns. However, the measuring principle per se can be implemented even if only one column and one row which form a contact region K are present.

It is not imperative to configure the resistor elements 5', 15' and the electrically conductive elements 4', 14' to be strip-shaped. On the contrary, provision may likewise be made to form each contact region K by a separate resistor element 5' and a further separate resistor element 15' between which an element 6' of poorly conductive material can be arranged. Provision may likewise be made for the resistor elements 5', 15' to contact the electrically conductive elements 4', 14' only on the contact regions K. Furthermore, provision may be made for each contact region K to be contacted with a separate, electrically conductive element 4' on the side formed by the first resistor element 5' and with a separate, electrically conductive element 14' on the side formed by the further resistor element 15'.

Figure 9:
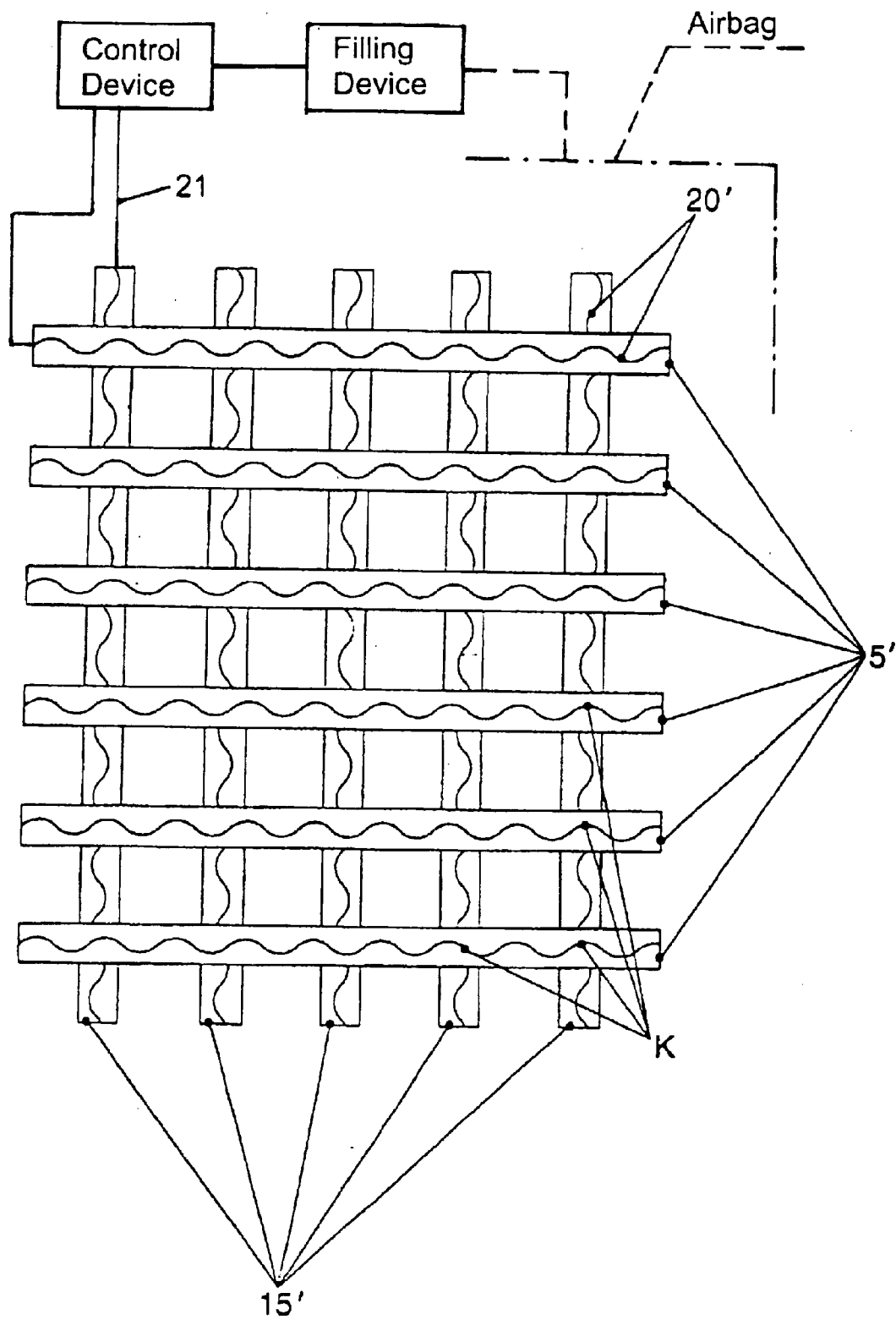
FIG. 9 is a diagrammatic view of an airbag device with a sensor according to the invention in accordance with a second exemplary embodiment.

FIG. 9 shows schematically a second exemplary embodiment of an airbag device according to the invention. A filling device is provided for filling the airbag which is only schematically indicated by a dashed-dotted line. A control device or evaluation device is connected to the sensor via control lines or evaluation lines 21 and is also operatively connected to the filling device. The sensor according to the invention has a number of strip-shaped resistor elements 5' arranged in rows and a number of strip-shaped resistor elements 15' arranged in columns, the resistor elements again forming a matrix-like grid of contact regions K. Instead of the metal strips 4', 14' of the first exemplary embodiment, electrically conductive fibers 20' are embedded here in the resistor elements 5', 15'. The contact regions K of the resistor elements 5', 15' can have voltage applied to them via the fibers 20', which are formed in this exemplary embodiment from metal. For this purpose, the metal fibers 20' can be connected to an evaluation device or control device via connecting lines. The fibers 20' run in a meandering manner in the resistor elements 5', 15', so that if the resistor elements 5', 15' stretch, only the meander of the fibers 20' is extended, but the fibers 20' are not stretched or torn off. For the sake of simplicity, the illustration of further components of the sensor has been omitted in the second exemplary embodiment. It is understood that the sensor according to the second exemplary embodiment may also have one or more elements 6' of poorly conductive material on the contact points K between the resistor elements 5', 15', and may be integrated in a fabric and fixed on the latter, as already described in the first exemplary embodiment. As in the first exemplary embodiment, it is also not absolutely necessary here for the resistor elements 5', 15' to be contacted over their entire length by fibers 20', as shown in FIG. 9. It may be entirely sufficient if the resistor elements 5', 15' are contacted by the fibers 20' only on the contact regions K or on selected contact regions K.

Figure 10:
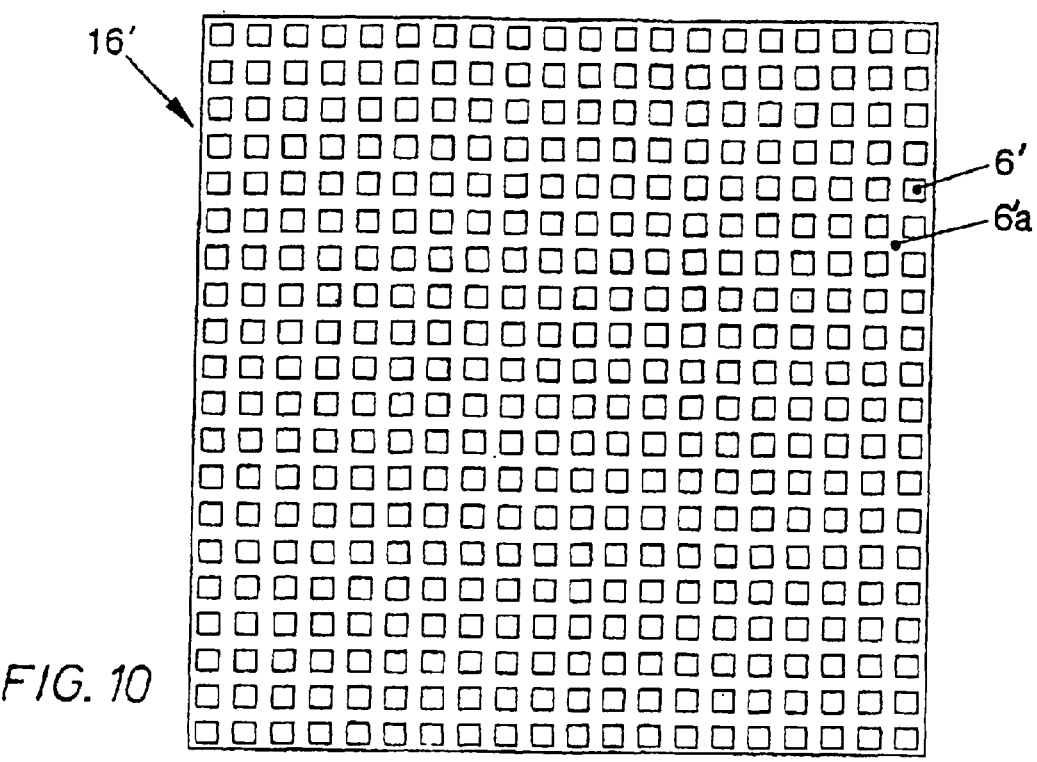
FIG. 10 is a diagrammatic plan view of a sheet-like element according to the invention.

FIG. 10 shows a configuration of the elements 6' of poorly conductive material that differs from the first exemplary embodiment. In this case, the elements 6' of poorly conductive material are not of strip-shaped configuration, but rather are configured as components of a sheet-like layer 16'. The layer 16' has a plurality of elements 16' of poorly conductive material, the number of which corresponds to the number of contact regions K of the sensor. In the layer 16', the elements 6' of poorly conductive material are arranged in the manner of a chessboard pattern and are delimited from one another by column and line regions 6'a of an insulating material. The integration of the elements 6' of poorly conductive material in the layer 16' has the advantage that, during the production of the sensor as a whole, the layer 16' can be placed between the resistor elements 5', 15', which results in a lower outlay on manufacturing than if individual elements 6' of poorly conductive material have to be inserted between the resistor elements 5', 15'.

Figure 11:
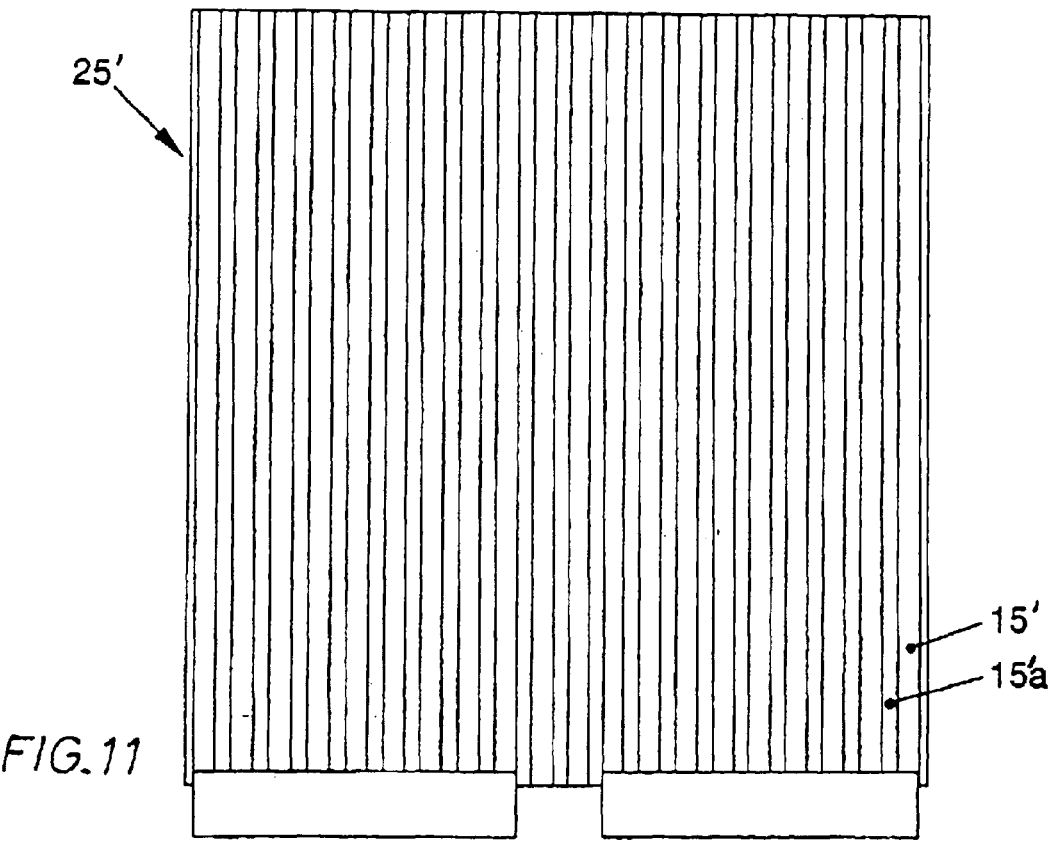
FIG. 11 is a diagrammatic plan view of a sheet-like configuration of resistor elements according to the invention.

FIG. 11 shows an configuration of strip-shaped resistor elements 15' that differs from the first exemplary embodiment. The latter are integral components of a sheet-like configuration 25' in which the resistor elements 15' are delimited from one another by insulating regions 15'a. This results in the advantage, as already in the case of the layer 16' containing the elements 6' of poorly conductive material, that the resistor elements 15' do not have to be placed individually into the sensor during production of the latter, but that only the sheet-like configuration with the resistor elements 15' has to be placed as a fitted part into the sensor. This likewise results in a reduced outlay on manufacturing the sensor.

We claim:

1. An airbag device for a vehicle, comprising:
    an airbag configured to advance into a passenger compartment when being inflated, said airbag having a side moving toward an occupant when being inflated;
    a filling device configured to inflate said airbag with gas;
    a control device operatively connected to said filling device, said control device controlling said filling device via a control signal;
    at least one sensor element disposed on said side of said airbag moving toward the occupant when being inflated, said at least one sensor element being responsive to local pressure changes, said at least one sensor element passing sensed pressure changes as a sensor signal to said control device;
    said at least one sensor element being formed of sensor strips crossing over one another, said sensor strips being resistor elements and being configured to detect pressure changes;
    said resistor elements forming a matrix grid with rows and columns of spaced apart contact regions of said resistor elements;
    a respective one of said contact regions of corresponding two of said resistor elements having a respective electrical resistance dependent on one of a force loading and a pressure loading of said respective one of said contact regions;
    an electrically conductive element in electrical contact with one of said resistor elements at one of said contact regions, said electrically conductive element applying a voltage to said one of said resistor elements at said one of said contact regions, said electrically conductive element having a lower resistance than said one of said resistor elements; and
    said filling device being controlled such that a quantity of gas supplied by said filling device can be controlled in response to a sensor signal supplied by said resistor elements detecting an advancing movement of said airbag.

2. The airbag device according to claim 1, wherein:
    a first set of said sensor strips are first sensor strips extending substantially parallel to one another and being spaced apart from one another;
    a second set of said sensor strips are second sensor strips extending substantially parallel to one another and being spaced apart from one another; and
    said second sensor strips cross over said first sensor strips.

3. The airbag device according to claim 2, wherein said second sensor strips cross over said first sensor strips such that crossing-over points are defined and such that gaps are formed adjacent said crossing-over points.

4. The airbag device according to claim 3, wherein said first sensor strips are spaced apart from one another by a substantially same distance and said second sensor strips are spaced apart from one another by a substantially same distance such that said gaps form a regular pattern.

5. The airbag device according to claim 3, wherein said first sensor strips are offset through 90° with respect to said second sensor strips such that said gaps are substantially rectangular gaps.

6. The airbag device according to claim 1, wherein:
    at least one fabric layer forms an airbag outer skin and at least a further fabric layer forms an airbag inner skin; and
    said airbag has an airbag impact region, said airbag outer skin and said airbag inner skin are provided at least in said airbag impact region on both sides of said sensor strips such that said airbag outer skin and said airbag inner skin cover said sensor strips in said airbag impact region and said sensor strips are accommodated between said airbag outer skin and said airbag inner skin.

7. The airbag device according to claim 6, wherein said airbag is a one-piece-woven airbag with an airbag fabric, and said sensor strips are woven into said airbag fabric.

8. The airbag device according to claim 7, wherein said sensor strips are woven between two layers of said airbag fabric of said one-piece-woven airbag.

9. The airbag device according to claim 7, wherein said sensor strips are woven between two layers of said airbag fabric of said one-piece-woven airbag such that said two layers form pockets.

10. The airbag device according to claim 8, wherein:
a first set of said sensor strips are first sensor strips extending substantially parallel to one another and being spaced apart from one another;
a second set of said sensor strips are second sensor strips extending substantially parallel to one another and being spaced apart from one another;
said second sensor strips cross over said first sensor strips;
said second sensor strips cross over said first sensor strips such that crossing-over points are defined and such that gaps are formed adjacent said crossing-over points; and
said two layers of said airbag fabric of said one-piece-woven airbag are woven together at least at one of said gaps adjacent to said crossing-over points.

11. The airbag device according to claim 6, wherein:
a first set of said sensor strips are first sensor strips extending substantially parallel to one another and being spaced apart from one another;
a second set of said sensor strips are second sensor strips extending substantially parallel to one another and being spaced apart from one another;
said second sensor strips cross over said first sensor strips such that crossing-over points are defined and such that gaps are formed adjacent said crossing-over points; and
seams are provided such that said at least one fabric layer and said further fabric layer disposed on opposite sides of said sensor strips are stitched together and such that said gaps form passage openings for said seams.

12. The airbag device according to claim 11, wherein said seams hold said sensor strips in a given position.

13. The airbag device according to claim 12, wherein:
said first and second sensor strips cross over one another such that a plurality of rows of gaps is formed, said rows of gaps extend substantially parallel to one another and are spaced apart from one another; and
said at least one fabric layer and said further fabric layer are stitched together along at least a part of said rows of gaps.

14. The airbag device according to claim 13, wherein said seams define a stitching direction, and said seams cross under a first part of said first sensor strips and cross over a second part of said first sensor strips as seen in the stitching direction.

15. The airbag device according to claim 13, wherein said seams define a stitching direction, and said seams cross under a first part of said second sensor strips and cross over a second part of said second sensor strips as seen in the stitching direction.

16. The airbag device according to claim 14, wherein said seams, as seen from one of said gaps to an adjacent one of said gaps, alternately cross over and under said first sensor strips.

17. The airbag device according to claim 15, wherein said seams, as seen from one of said gaps to an adjacent one of said gaps, alternately cross over and under said second sensor strips.

18. The airbag device according to claim 11, wherein said seams run parallel to said first sensor strips.

19. The airbag device according to claim 11, wherein said seams run parallel to said second sensor strips.

20. The airbag device according to claim 11, wherein said seams run transversely alternately over and under said crossing-over points where said first and second sensor strips cross one another.

21. The airbag device according to claim 2, including a control line connecting said first sensor strips to said control device.

22. The airbag device according to claim 21, wherein said first sensor strips are of substantially equal length and each of said first sensor strips has an end region connected to said control line.

23. The airbag device according to claim 2, including a control line connecting said second sensor strips to said control device.

24. The airbag device according to claim 23, wherein said second sensor strips are of substantially equal length and each of said second sensor strips has an end region connected to said control line.

25. The airbag device according to claim 1, wherein said electrically conductive element is a strip-shaped element disposed along one of said rows of said contact regions of said resistor elements.

26. The airbag device according to claim 1, wherein said electrically conductive element is a strip-shaped element disposed along one of said columns of said contact regions of said resistor elements.

27. The airbag device according to claim 1, wherein said electrically conductive element is a strip-shaped element disposed along one of said resistor elements and is in contact with said one of said resistor elements.

28. The airbag device according to claim 1, wherein said electrically conductive element is an electrically conductive fiber embedded in one of said resistor elements.

29. The airbag device according to claim 28, wherein said one of said resistor elements has a given length, and said electrically conductive fiber extends over at least part of said given length of said one of said resistor elements.

30. The airbag device according to claim 29, wherein said electrically conductive fiber extends in a meander pattern in said one of said resistor elements.

31. The airbag device according to claim 1, wherein an element formed of a poorly conductive material is disposed between two of said resistor elements at one of said contact regions of said resistor elements.

32. The airbag device according to claim 31, wherein said one of said contact regions has a given area, and said element formed of poorly conductive material entirely covers said given area of said one of said contact regions.

33. The airbag device according to claim 1, wherein elements formed of a poorly conductive strip-shaped material are disposed between respective two of said resistor elements at respective ones of said contact regions of said resistor elements and extend along respective ones of said resistor elements.

34. The airbag device according to claim 1, including:
a layer disposed between a first and a second group of said resistor elements, said first group of said resistor elements being disposed along said rows, said second group of said resistor elements being disposed along said columns;
said layer having insulating column regions, insulating row regions, and poorly conductive elements delimited by said insulating column regions and by said insulating row regions such that said poorly conductive elements form a chessboard pattern; and
said poorly conductive elements being disposed between said resistor elements at said contact regions of said resistor elements.

35. The airbag device according to claim 1, including:
a fabric, said matrix grid being disposed in said fabric; and electrodes fastened to said fabric, said electrodes being disposed in rows and columns and being in contact with said electrically conductive element and further electrically conductive elements.

36. The airbag device according to claim 1, wherein at least some of said resistor elements disposed in said rows and said columns are integrated in a sheet configuration, said sheet configuration has insulating regions separating said at least some of said resistor elements from one another.

37. The airbag device according to claim 1, wherein said airbag is a motor vehicle airbag.

* * * * *